United States Patent [19]

Hammarberg

[11] Patent Number: 4,631,475

[45] Date of Patent: Dec. 23, 1986

[54] METHOD OF DETECTING HAZARDOUS LINE VOLTAGES OVER A TWO-WIRE LINE

[75] Inventor: Lars E. Hammarberg, Handen, Sweden

[73] Assignee: Telefonaktiebolaget LM Ericsson, Stockholm, Sweden

[21] Appl. No.: 626,865

[22] PCT Filed: Dec. 20, 1983

[86] PCT No.: PCT/SE83/00464

§ 371 Date: Jun. 29, 1984

§ 102(e) Date: Jun. 29, 1984

[87] PCT Pub. No.: WO84/02625

PCT Pub. Date: Jul. 5, 1984

[30] Foreign Application Priority Data

Dec. 21, 1982 [SE] Sweden ................................. 8207303

[51] Int. Cl.$^4$ ............................................. H04B 3/46
[52] U.S. Cl. ...................................... 324/102; 379/24; 379/26
[58] Field of Search ............. 324/102, 525, 526, 57 R; 370/32; 179/175.3 F, 175.3 A, 175.3 R, 175.31 E, 170.2

[56] References Cited

U.S. PATENT DOCUMENTS

| | | | |
|---|---|---|---|
| 4,203,012 | 5/1980 | Boxall | 179/170 NC |
| 4,539,674 | 9/1985 | Carlquist et al. | 370/32 |
| 4,547,633 | 10/1985 | Széchényi | 179/175.3 F |
| 4,549,049 | 10/1985 | Guidoux | 179/175.31 E |

FOREIGN PATENT DOCUMENTS

| | | | |
|---|---|---|---|
| 2839875 | 3/1980 | Fed. Rep. of Germany | 370/32 |
| 27756 | 2/1980 | Japan | 179/175.3 F |

Primary Examiner—Stephen A. Kreitman
Assistant Examiner—Scott M. Oldham
Attorney, Agent, or Firm—Roberts, Spiecens & Cohen

[57] ABSTRACT

A method of detecting hazardous line voltages over a two-wire line for transferring digital information. At one end, the line is terminated by a hybrid coupler (G) and an apparatus for adaptive echo elimination. This apparatus generates a digital signal (d) constituting an unambiguous measure of the difference between the line impedance ($Z_L$) and the hybrid impedance (Z). This signal is compared with two digital limiting values ($d_1, d_2$) an alarm being given should either these two values be reached or exceeded.

3 Claims, 2 Drawing Figures

METHOD OF DETECTING HAZARDOUS LINE VOLTAGES OVER A TWO-WIRE LINE

FIELD OF INVENTION

The present invention relates to a method of detecting hazardous line voltages over a two-wire line, e.g. for transferring digital information (data transmission). The method is only applicable when the two-wire line is terminated at one end with a hybrid coupler and associated circuits for adaptive echo elimination.

BACKGROUND

Methods and apparatus for detecting hazardous line voltages known in the prior art involve connecting fusing resistors and threshold sensing elements into the two-wire line, overvoltages then causing rupture or short-circuiting. Such protection in an electronic telephony installation is illustrated in Swedish Patent Application No. 7600255-9, for example. Protection here comprises fusing resistors and Zener diode combinations for preventing overvoltages arising between the line wires and ground. Furthermore, it is already known to connect test relays to both wires, e.g. in the vicinity of the hybrid coupler. When the line condition is to be tested, the relay opens the line and its impedance is measured, whereby information is given as to possible abnormal conditions such as short-circuiting or rupture.

SUMMARY OF INVENTION

The method in accordance with the invention has the aim of utilizing properties of an apparatus for adaptive echo elimination, known per se, and described in, for example, the Swedish Patent Application No. 8106444-6. As is described in this application, a correction unit in the apparatus gives a digital signal to a balance filter for the two-wire line. As is well known in the art, this signal is an unambiguous measure of the difference between the actual line impedance and the hybrid impedance. The hybrid impedance is dependent on the design of the hybrid coupler and is defined as the impedance that, when connected to the two-wire port instead of the two-wire line, gives high attenuation between the four-wire ports. However, the impedance of the two-wire line is dependent on the actual cables and is usually never equal to the hybrid impedance. The line condition can be detected by comparing said digital value with one or more stipulated digital limiting values. The need of the above mentioned test relays is thus precluded, but for protecting the line there are still protective resistors and special components, e.g. Zener diode combinations, for short-circuiting the line wires should there be overvoltage.

An object of the present invention is thus to provide a method of detecting abnormal conditions in a two-wire line, which is terminated by a hybrid coupler and associated circuitry for adaptive echo elimination and which obviates the need for special test relays.

In accordance with the invention and as will be shown in detail hereinafter, there is provided a method of detecting hazardous line voltages occurring over a two-wire connection resulting from a cutoff or a short circuiting, the connection being terminated by a hybrid coupler and an apparatus for adaptive echo elimination, which sends a digital signal which stands in an unambiguous relation to the line impedance of the connection, said method comprising comparing said digital signal with at least one digital limit value corresponding to an upper or lower limit of the normal value of the line impedance. In response to the thusly made comparison, an alarm signal is transmitted.

In further accordance with the invention, the aforesaid digital signal is compared with a first digital limiting value corresponding to a break in the line and also with a second digital limiting value corresponding to a short-circuit in the line. In further accordance with the invention, the aforesaid first and second digital limiting values correspond to a first and a second finite value of line impedance.

BRIEF DESCRIPTION OF DRAWINGS

The invention will now be described in detail with reference to the accompanying drawing, in which.

BEST MODES FOR CARRYING OUT THE INVENTION

Figure 1:
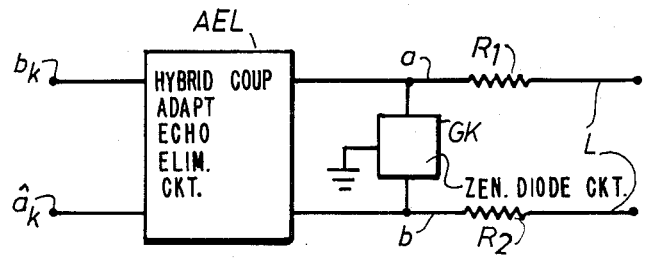
FIG. 1 schematically illustrates a two-wire line and its connection to an apparatus for adaptive echo elimination.

In the block diagram according to FIG. 1, the two-wire line is denoted by L and its condition is monitored by the method in accordance with the invention. The resistors $R_1$ and $R_2$ connected to the respective line wires a, b are protective resistors. The block GK symbolizes a special component, e.g. a Zener diode combination, which provides short-circuiting should there be overvoltages across the wires a and b. The protective resistors $R_1$ and $R_2$ cause a break for overvoltage. The line L is terminated at a unit AEL, which includes a hybrid coupler and an apparatus for adaptive echo elimination, described in the above-mentioned Swedish Patent Application.

The protective components $R_1$, $R_2$ and GK thus put the line L into a short-circuited or cut-off condition. In accordance with the inventive method, both these conditions can be simply detected in the adaptive echo eliminator included in the block AEL, by the signal value which is used for eliminating the echo exceeding a given level.

Figure 2:
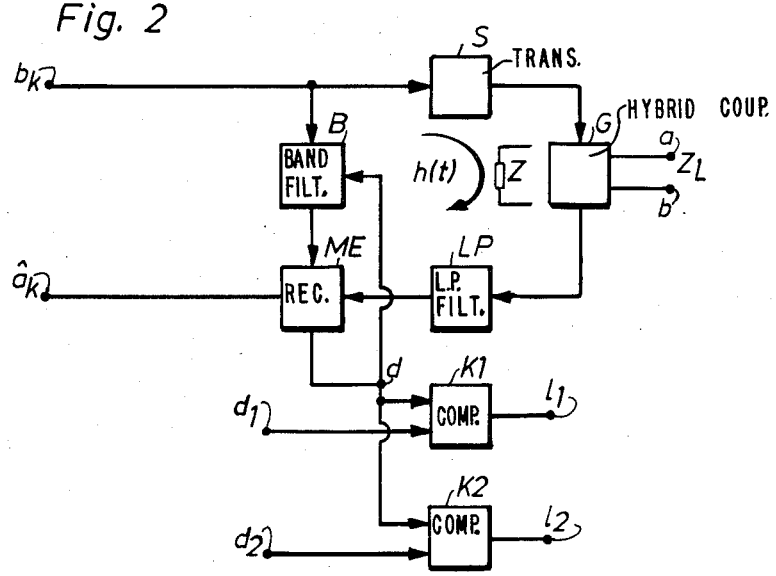
FIG. 2 is a block diagram, for more closely describing the method in accordance with the invention.

FIG. 2 is a block diagram more closely illustrating the procedure. The block G is the hybrid coupler in the adaptive echo eliminator AEL, and has a fork hybrid impedance Z. The incoming line is assumed to have a line impednace $Z_L$ of a given value but which, according to the above, can be zero or infinity for an abnormal condition.

Outgoing data $b_k$ is recoded in a transmitter unit S, which is connected to the hybrid coupler G, recoded data then being sent over the line L. Incoming data from a remote end to the hybrid coupler G is taken further via a lowpass filter LP to a receiver unit ME for detection. By $â_k$ is denoted estimated values of said incoming data. A digital-type balance filter B is connected from the transmission path to a compensation circuit (not illustrated here), included in the receiver unit ME for compensating the leakage signals transferred via the hybrid coupler G from the transmitter side to the receiver side. In a well known manner, the transfer function of the balance filter B can be changed by a digital correction signal d being formed in the receiver unit ME. This signal is in an unambiguous relation to the impedance change occurring in the line impedance $Z_L$, since, as is well known in the arts, the magnitude of the leakage signal h(t) through the hybrid coupler is dependent on the difference between the hybrid impedance Z and the line impedance $Z_L$, the digital signal d being formed in response to this difference.

In accordance with the invention, comparators are therefore connected to an output of the unit ME, across which the signal d occurs. As an example, two comparators K1 and K2 are illustrated in FIG. 2, one input of both comparators being connected to the mentioned output of the unit ME. A digital limiting value $d_1$ is applied across the second input of the comparator K1 and correspnods to the value which the signal d assumes, e.g. for a break in the line. A digital limit value $d_2$ is applied across the second input of the second comparator K2 and corresponds to the value which the signal d assumes for short-circuiting on the line. The values of $d_1$ and $d_2$ are dependent on the actual design of the hybrid coupler. Both $d_1$ and $d_2$ correspond to a great difference between the actual line impedance and the hybrid impedance. Both a short-circuiting and a break in the line give high numerical values to the digital correction signal d, but with different signs. The comparators K1 and K2 thus carry out comparison of the value d with the values $d_1$ and $d_2$ each time the digital value d is changed, with the object of up-dating the parameters of the balance filter B. The comparators K1 and K2 can either be implemented as circuit blocks containing logical circuits (gate functions) or they may also comprise programmable memory units (PROM's). In the latter case, there is provided the opportunity of distinguishing different error categories over the line L, e.g. short-circuiting at different line distances. The values $d_1$ and $d_2$ can then be programmed into the desired limit value from a microprocessor in the receiver. When the digital value d exceeds or equals the limit value in the respective block corresponding to the value $d_1$ or $d_2$ an alarm signal is given across the respective comparator output $l_1, l_2$.

I claim:

1. A method of detecting hazardous line voltages occurring over a two-wire connection (L) resulting from a cut-off or a short-circuiting, the connection being terminated by a hybrid coupler (G) and an apparatus (ME, B, LP) for adaptive echo elimination, which sends a digital signal (d) which stands in an unambiguous relation to the line impedance ($Z_L$) of the connection, said method comprising comparing said digital signal (d) with at least one digital limit value ($d_1$ or $d_2$), corresponding to an upper or lower limit of the normal value of the line impedance ($Z_L$), and sending an alarm signal in response to the thusly made comparison.

2. A method as claimed in claim 1, wherein said digital signal (d) is compared with a first digital limiting value ($d_1$) corresponding to a break in the line, and also with a second digital limiting value ($d_2$) corresponding to a short-circuit in the line.

3. A method as claimed in claim 2 wherein said first and second digital limiting values correspond to a first and a second finite value of line impedance ($Z_L$).

* * * * *